(12) United States Patent
Phillips et al.

(10) Patent No.: US 7,507,103 B1
(45) Date of Patent: Mar. 24, 2009

(54) ELECTRICAL COMPONENT LATCH

(75) Inventors: Michael J. Phillips, Camp Hill, PA (US); Michael E. Cowher, Harrisburg, PA (US)

(73) Assignee: Tyco Electronics Corporation, Middletown, PA (US)

( * ) Notice: Subject to any disclaimer, the term of this patent is extended or adjusted under 35 U.S.C. 154(b) by 0 days.

(21) Appl. No.: 11/950,293

(22) Filed: Dec. 4, 2007

(51) Int. Cl.
  *H01R 13/627* (2006.01)
(52) U.S. Cl. .................. 439/352; 439/357; 439/353
(58) Field of Classification Search .......... 439/352, 439/353, 358, 357, 316, 364, 436
See application file for complete search history.

(56) References Cited

U.S. PATENT DOCUMENTS

| | | | |
|---|---|---|---|
| 5,915,989 A * | 6/1999 | Adriaenssens et al. ...... | 439/404 |
| 6,312,277 B1 * | 11/2001 | Holub ........................ | 439/352 |
| 6,346,002 B1 * | 2/2002 | Hsu et al. ................... | 439/358 |
| 6,371,787 B1 | 4/2002 | Branch et al. | |
| 6,434,015 B1 | 8/2002 | Hwang | |
| 6,556,445 B2 | 4/2003 | Medina | |
| 6,716,054 B1 * | 4/2004 | Denovich et al. ........... | 439/404 |
| 6,805,573 B2 | 10/2004 | Phillips et al. | |
| 6,821,139 B1 * | 11/2004 | Wu ............................. | 439/352 |
| 6,887,091 B1 * | 5/2005 | Wu ............................. | 439/352 |
| 7,033,218 B2 * | 4/2006 | Huang et al. ................ | 439/607 |
| 7,134,900 B2 * | 11/2006 | Chung ........................ | 439/353 |
| 7,201,601 B2 * | 4/2007 | Lappohn ..................... | 439/404 |
| 7,318,740 B1 * | 1/2008 | Henry et al. ................ | 439/352 |
| 7,322,845 B2 * | 1/2008 | Regnier et al. ............. | 439/352 |

* cited by examiner

*Primary Examiner*—T C Patel
*Assistant Examiner*—Harshad C Patel

(57) ABSTRACT

A latch includes a body extending a length between a latch end portion and a spring end portion that is opposite the latch end portion. The body includes a latch portion that includes the latch end portion, a spring portion that includes the spring end portion, and a central longitudinal axis extending along the length of the body. The latch portion includes a latch element. The latch portion is stiffer than at least a portion of the spring portion with respect to bending along the central longitudinal axis.

19 Claims, 11 Drawing Sheets

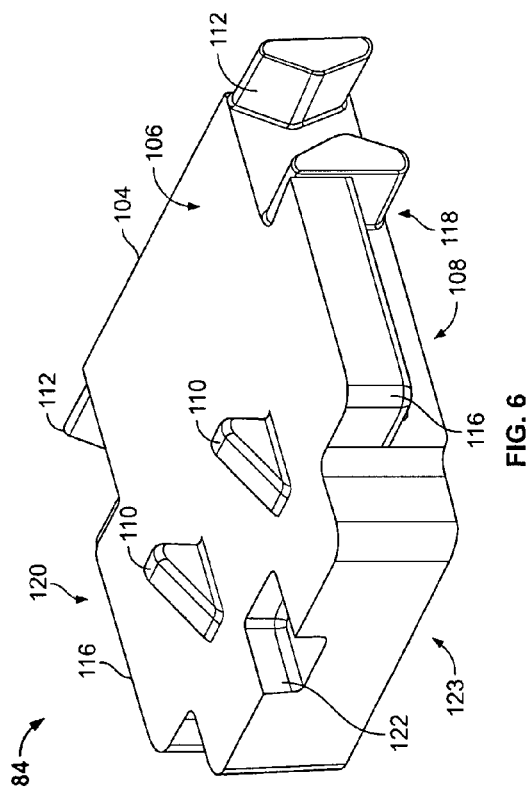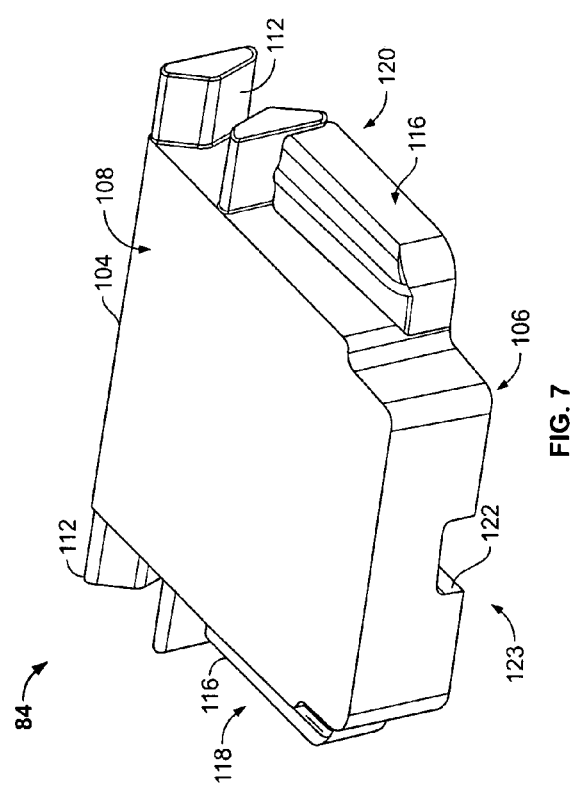

ELECTRICAL COMPONENT LATCH

BACKGROUND OF THE INVENTION

The subject matter herein relates generally to pluggable electrical components, and more particularly, to a latch for pluggable electronic modules.

Various types of fiber optic and copper based transceivers that permit communication between electronic host equipment and external devices are known. These transceivers may be incorporated into modules that can be pluggably connected to the host equipment to provide flexibility in system configuration. The modules are constructed according to various standards for size and compatibility, one standard being the Small Form-factor Pluggable (SFP) module standard.

SFP modules are plugged into a receptacle that is mounted on a circuit board within the host equipment. The receptacle includes an elongated guide frame, or cage, having a front that is open to an interior space, and an electrical connector disposed at a rear of the guide frame within the interior space. Both the connector and the guide frame are electrically and mechanically connected to the circuit board, and when an SFP module is plugged into a receptacle it is electrically and mechanically connected to the circuit board as well.

SFP modules typically include a latch element that cooperates with a latch element on the guide frame to latch the SFP module to the receptacle. At least some known latch elements of SFP modules include a retractable pin that is received within a triangular opening of the latch element of the guide frame. However, the retractable pins of conventional SFP module latch elements may have complicated actuating mechanisms and/or may take up more space than is desired within a housing of the SFP module.

There is a need for an electrical component latch that has a less complicated actuating mechanism and/or that takes up less space within a housing of the electrical component.

BRIEF DESCRIPTION OF THE INVENTION

In one embodiment, a latch is provided that includes a body extending a length between a latch end portion and a spring end portion that is opposite the latch end portion. The body includes a latch portion that includes the latch end portion, a spring portion that includes the spring end portion, and a central longitudinal axis extending along the length of the body. The latch portion includes a latch element. The latch portion is stiffer than at least a portion of the spring portion with respect to bending along the central longitudinal axis.

In another embodiment, an electrical component assembly is provided. The electrical component assembly is configured to engage a receptacle assembly and includes a housing configured to be at least partially received into the receptacle assembly, and a latch held by the housing. The latch includes a body extending a length between a latch end portion and a spring end portion that is opposite the latch end portion. The body includes a latch portion that includes the latch end portion, a spring portion that includes the spring end portion, and a central longitudinal axis extending along the length of the body. The latch portion includes a latch element. The latch and spring portions are joined together by a twisted portion such that the latch portion is rotationally displaced about the longitudinal axis with respect to the spring portion.

In another embodiment, an electrical component assembly is provided. The electrical component assembly is configured to engage a receptacle assembly and includes a housing configured to be at least partially received into the receptacle assembly, and a latch held by the housing. The latch includes a body having a latch portion joined to a spring portion. The latch portion includes a latch element. The spring portion is configured to bend to move the latch element between a latched position and an unlatched position.

BRIEF DESCRIPTION OF THE DRAWINGS

FIG. 6 is a perspective view of an exemplary embodiment of an actuator slide of the pluggable electrical component shown in FIGS. 3 and 4.

FIG. 7 is another perspective view of the actuator slide shown in FIG. 6.

DETAILED DESCRIPTION OF THE INVENTION

Figure 1:
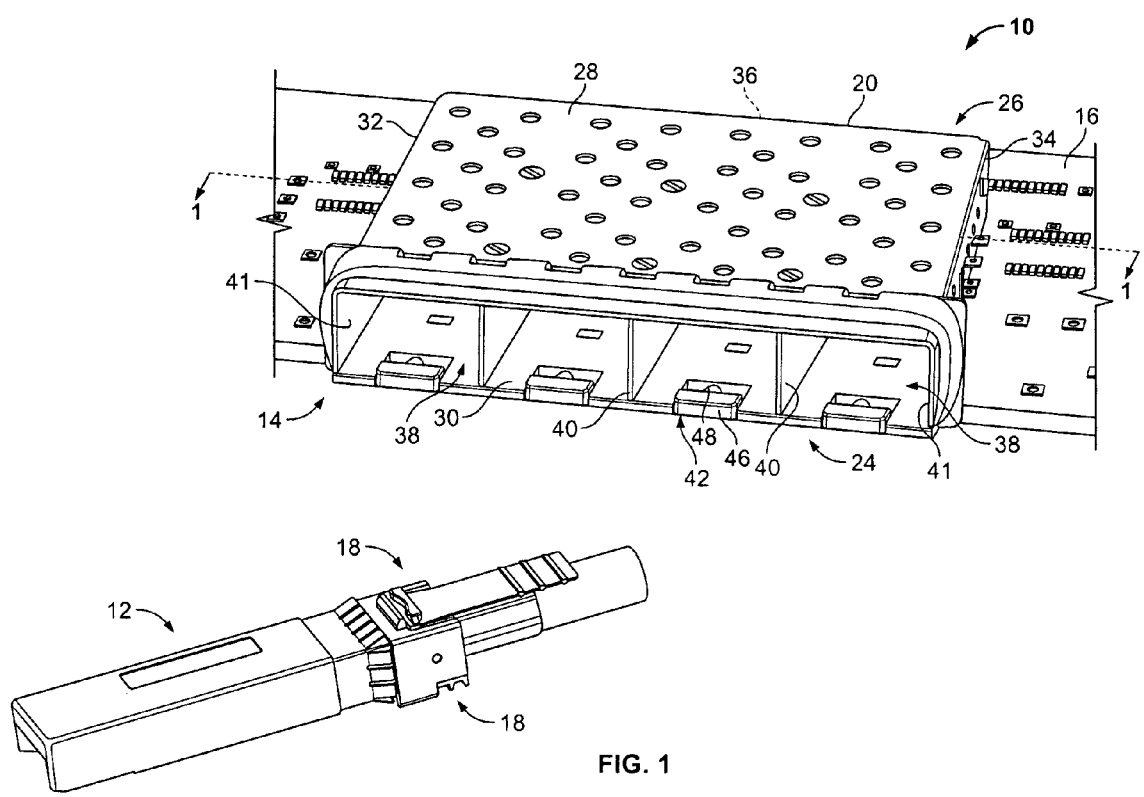
FIG. 1 is a partially exploded perspective view of an exemplary embodiment of an electrical connector system.

FIG. 1 is a partially exploded perspective view of an exemplary embodiment of an electrical connector system 10. The system 10 includes a plurality of pluggable electrical components 12 (only one is shown in FIG. 1) configured to be plugged into a receptacle assembly 14 that is mounted to a host circuit board 16. As will be described below, the pluggable electrical component 12 includes a latch assembly 18 for latching the pluggable electrical component to the receptacle assembly 14. The receptacle assembly 10 includes a guide frame 20 having a plurality of electrical connectors 22 (FIG. 2) positioned therein. The receptacle assembly 14 is positioned on the circuit board 16 for electrically connecting a plurality of the pluggable electrical components 12 to the circuit board 16 via the electrical connectors 22. A plug end portion 24 of the guide frame 20 through which the pluggable electrical components 12 are installed into the receptacle assembly 14 is configured to be mounted, or received, within an opening of a panel (not shown) that is adjacent the circuit board 16. For example, the panel may be a wall of a housing of a device (not shown), such as, but not limited to, a computer, that includes the circuit board 16. In such an example, the receptacle assembly 14 enables pluggable electrical components 12 located outside the housing to be electrically connected to the circuit board 16 contained within the housing.

The guide frame 20 extends between the plug end portion 24 and an opposite rear end portion 26. In the illustrated embodiment, the guide frame 20 includes a generally rectangular cross section, for example taken along line 1-1 of FIG. 1, and includes an upper wall 28, a lower wall 30, side walls 32 and 34, and a rear wall 36. However, the guide frame 20 may include any suitable cross-sectional shape that enables the guide frame 20 to function as described herein. The guide frame 20 includes an internal chamber that is subdivided into a plurality of internal compartments 38, which are arranged in a row. Specifically, in the illustrated embodiment, the guide frame 12 includes three divider walls 40 that divide the internal chamber into four internal compartments 38. Each internal compartment 38 is configured to receive a pluggable electrical component 12 therein through a corresponding opening, or port, 41 at the plug end portion 24 that communicates with the corresponding internal compartment 38. For each internal compartment 38, the guide frame 20 also includes an opening (not shown) extending through the lower wall 30. The openings within the lower wall 30 are adjacent the rear end portion 26 of the guide frame 20 for receiving a corresponding one of the electrical connectors 22 within the corresponding internal compartment 38 of the guide frame 20. The openings within the lower wall 30 of the guide frame 20 also enable electrical connection between the electrical connectors 22 and the circuit board 16. Specifically, when the guide frame 20 is mounted on the circuit board and the electrical connectors 22 are positioned within the corresponding internal compartments 38, each electrical connector 22 is electrically connected to the circuit board 16. When the pluggable electrical components 12 are plugged into the corresponding internal compartments 38, each electrical connector 22 is electrically connected to the corresponding pluggable electrical component 12 to thereby interconnect the pluggable electrical component 12 to the circuit board 16.

Although the guide frame 20 is shown as including four internal compartments 38 arranged in a single row, the guide frame 20 may include any number of internal compartments 38, arranged in any number of rows and/or columns, for receiving any number of pluggable electrical components 12. In some embodiments, the guide frame 20 includes only one internal compartment 38 for receiving only one pluggable electrical component 12.

Each of the internal compartments 38 includes a latch element 42 on the lower wall 30 of the guide frame 20 adjacent the plug end portion 24 for cooperating with a latch element 44 (FIGS. 4, 5, 8, 10, and 11) of the latch assembly 18 of the corresponding pluggable electrical component 12, as will be described in more detail below. The latch elements 42 and 44 may each have any suitable shape and each include any suitable structure that enables the latch elements 42 and 44 to latch the electrical component 12 to the guide frame 20. In the illustrated embodiment, the latch element 42 includes an extension 46 having an opening 48 therein that engages the latch element 44. The openings 48 may have any suitable size and/or shape that enables the opening 48 to function as described herein. Although the latch elements 42 are each located on the lower wall 30 of the guide frame 20, the latch elements 42 may be located on any of the walls 28, 30, 32, and/or 34, and/or the internal dividers 40. Optionally, the extension 46 may also ground the pluggable electrical component 12 to the guide frame 20.

Figure 2:
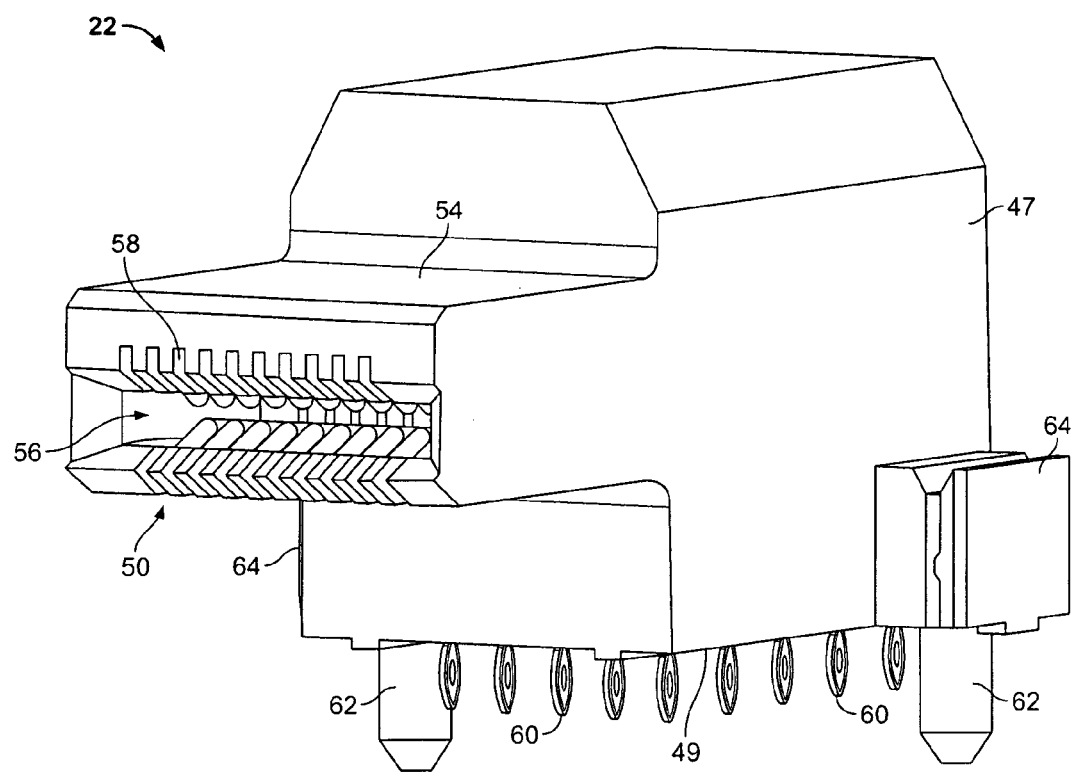
FIG. 2 is a perspective view of an exemplary embodiment of an electrical connector of the system shown in FIG. 1.

FIG. 2 is a perspective view of an exemplary embodiment of one of the electrical connectors 22. The electrical connector 22 includes a housing 47 having a lower face 49 for mating with the circuit board 16 (FIG. 1) and a mating face 50 for engagement with a plug end portion 52 (FIGS. 3 and 4) of the pluggable electrical component 12. Specifically, the mating face 50 includes an extension receptacle 54 that extends outwardly at the mating face 50. The extension receptacle 54 includes a terminal receptacle 56 that engages the plug end portion 52 of the corresponding pluggable electrical component 12. The terminal receptacle 56 includes one or more electrical contacts 58 that are electrically connected to corresponding electrical contacts 60 extending along the lower face 49 of the housing 47, such as, but not limited to, using electrical contacts (not shown) and/or circuit board traces (not shown) held within the housing 47. The electrical contacts 58 and 60 may each be any suitable type of electrical contact. The housing 47 may include alignment posts 62 and latching members 64 for aligning the electrical connector 22 within the guide frame 20 (FIG. 1) and latching the electrical connector 22 in place within the guide frame 20, respectively.

The electrical connector 22 can be positioned within the guide frame 20 by inserting the connector 22 through the corresponding opening within the guide frame lower wall 30. In such a position, the lower face 49 of the housing 47 extends adjacent the opening within the lower wall 30 of the guide frame 20 such that the electrical contacts 60 extend through the opening. When the guide frame 20 is positioned on the circuit board 16, the lower face 49 of the housing 47 engages the circuit board 16 such that the electrical contacts 60 extending along the lower face 49 of the housing 47 are electrically connected to the circuit board 16. The latching members 64 are each latched to either a side wall 32 or 34 or a divider wall 40. When the electrical connectors 22 are latched in place within the guide frame 20, each terminal receptacle 56 is aligned for receipt of the plug portion 52 of the corresponding pluggable electrical component 12.

Figure 3:
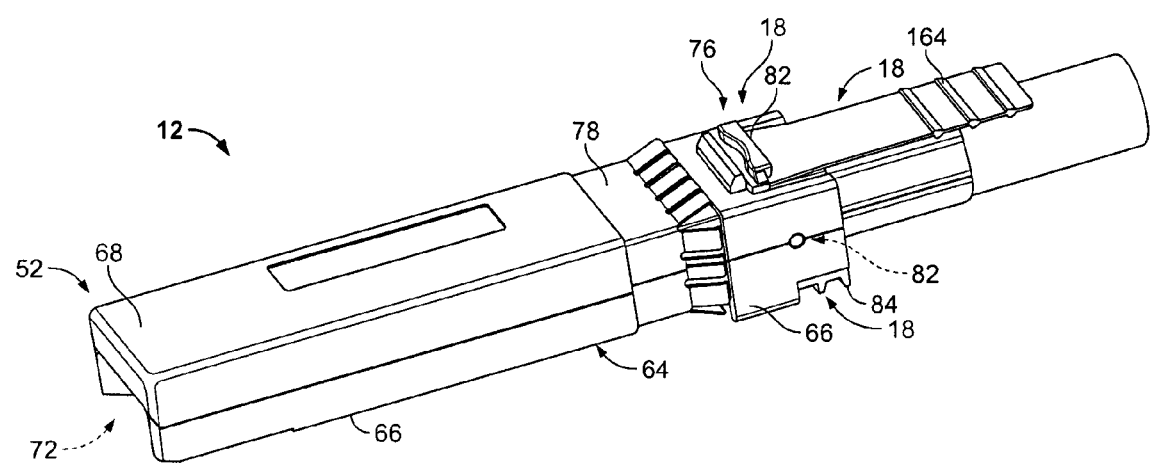
FIG. 3 is a perspective view of an exemplary embodiment of a pluggable electrical component of the system shown in FIG. 1.
Figure 4:
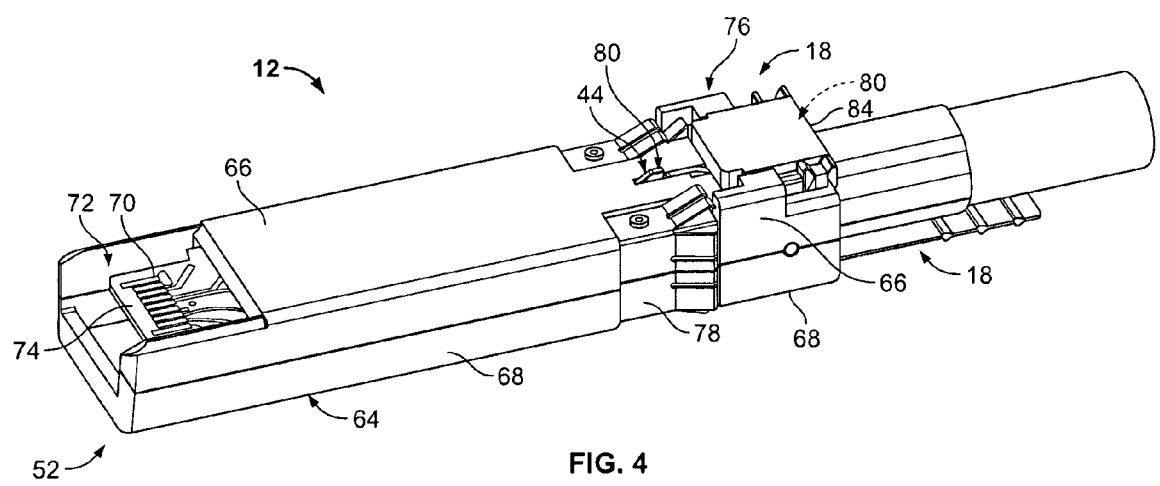
FIG. 4 is another perspective view of the pluggable electrical component shown in FIG. 3.

FIGS. 3 and 4 are perspective views of an exemplary embodiment of the pluggable electrical component 12. The pluggable electrical component 12 may be any suitable type of pluggable electrical component, such as, but not limited to, small form-factor pluggable (SFP) modules (including, but not limited to, XFP and QSFP modules), that enables the pluggable electrical component 12 to be received within a receptacle assembly, such as, but not limited to, the receptacle assembly 14 (FIG. 1). The pluggable electrical component 12 includes a housing 64 having a base 66 and a cover 68 that are secured together to form a protective shell for a circuit board 70 that is disposed within an interior cavity of the housing 64. The circuit board 70 may, in some embodiments, carry electronic circuitry and devices that perform transceiver functions. An edge portion 72 of the circuit board 70 is exposed through the plug end portion 52 of the component 12 such that the circuit board 70 is plugged into the terminal receptacle 56 (FIG. 2) of the corresponding electrical connector 22 (FIG. 2) when the pluggable electrical component 12 is fully plugged into the corresponding port 41 (FIG. 1) of the receptacle assembly guide frame 20 (FIG. 1). Specifically, when the pluggable electrical component 12 is fully plugged into the corresponding port 41 (FIG. 1) of the receptacle assembly guide frame 20 (FIG. 1), electrical contacts 74 held on the circuit board 70 are electrically connected to the corresponding electrical contacts 58 of the corresponding terminal receptacle 56. As such, the pluggable electrical component 12 can be electrically connected to the circuit board 16 (FIG. 1) via the corresponding electrical connector 22 held within the guide frame 20. The electrical contacts 74 may each be any suitable type of electrical contact.

When the pluggable electrical component 12 is fully plugged into the receptacle assembly 14, a front end portion 76 of component 12 extends from the receptacle assembly 14 at the plug end portion 24 thereof. The front end portion 76 of the pluggable electrical component 12 includes a connector interface that is joined to an optical fiber cable or an electrical cable, such as, but not limited to, a copper interface in the way of a modular jack (not shown), or to a fiber optic connector (not shown) for further interfacing.

The pluggable electrical component 12 may include features that ground the pluggable electrical component 12 to the guide frame 12. For example, in the exemplary embodiment the pluggable electrical component 12 includes a metallic spring gasket 78 that surrounds a portion of the housing 64 and engages the guide frame 20 when the pluggable electrical component 12 is plugged into the receptacle assembly 14. The spring gasket 78 may also facilitate containing electromagnetic interference (EMI) emissions.

Figure 10:
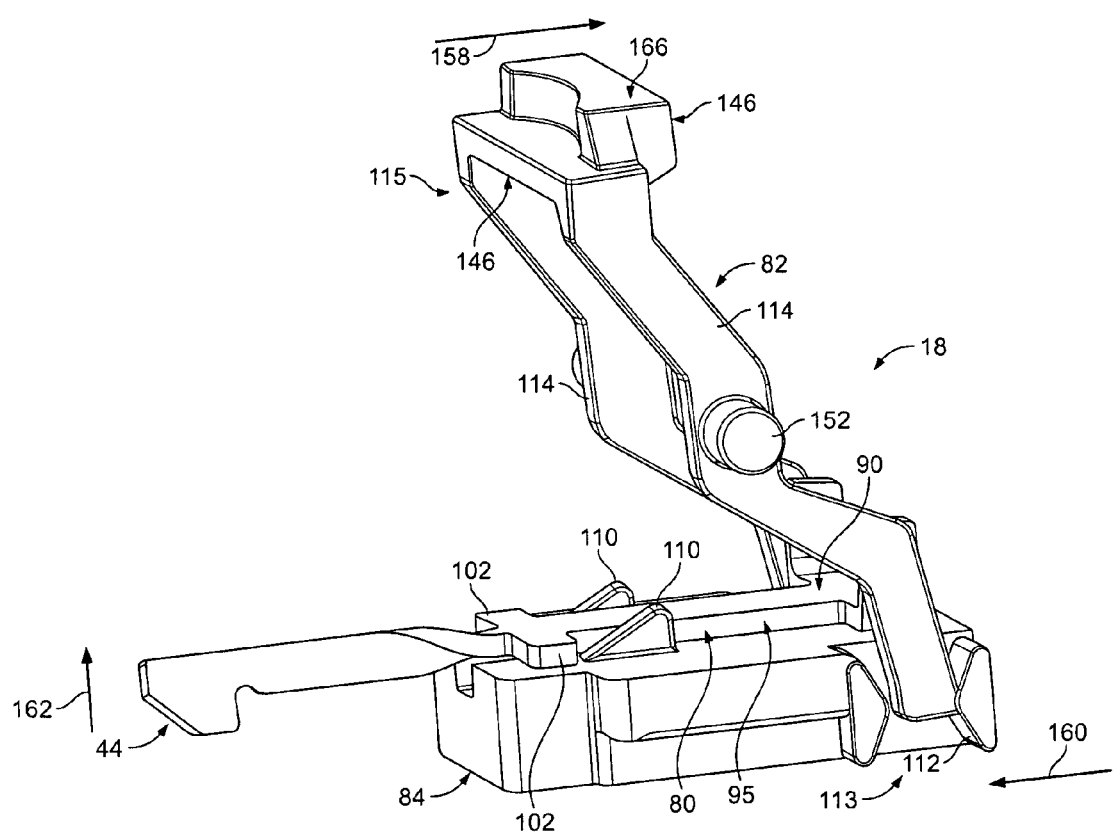
FIG. 10 is a perspective view of an exemplary embodiment of a latch assembly of the pluggable electrical component shown in FIGS. 3 and 4 shown in a latched position.
Figure 11:
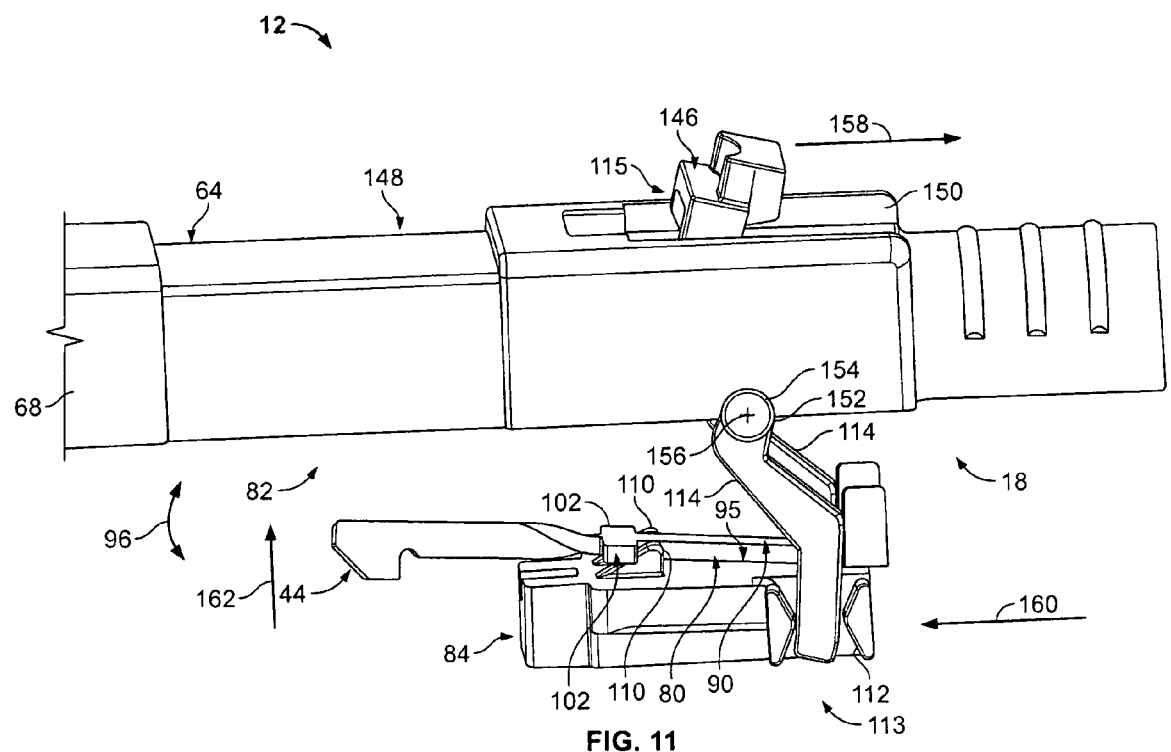
FIG. 11 is broken away perspective view of a portion of the electrical component shown in FIGS. 3 and 4 illustrating the latch assembly in an unlatched position.

As described above, the pluggable electrical component 12 includes the latch assembly 18 for latching the pluggable electrical component to the receptacle assembly 14, and more specifically to the corresponding latch element 42 of the guide frame 20. Referring to FIG. 10, the latch assembly 18 includes a latch body 80 that includes the latch element 44, an actuator arm 82, and an actuator slide 84. As will be described in more detail below, the actuator arm 82 and the actuator slide 84 cooperate with the latch body 80 to move the latch element 44 between a latched position (FIG. 10) and an unlatched position (FIG. 11).

Figure 5:
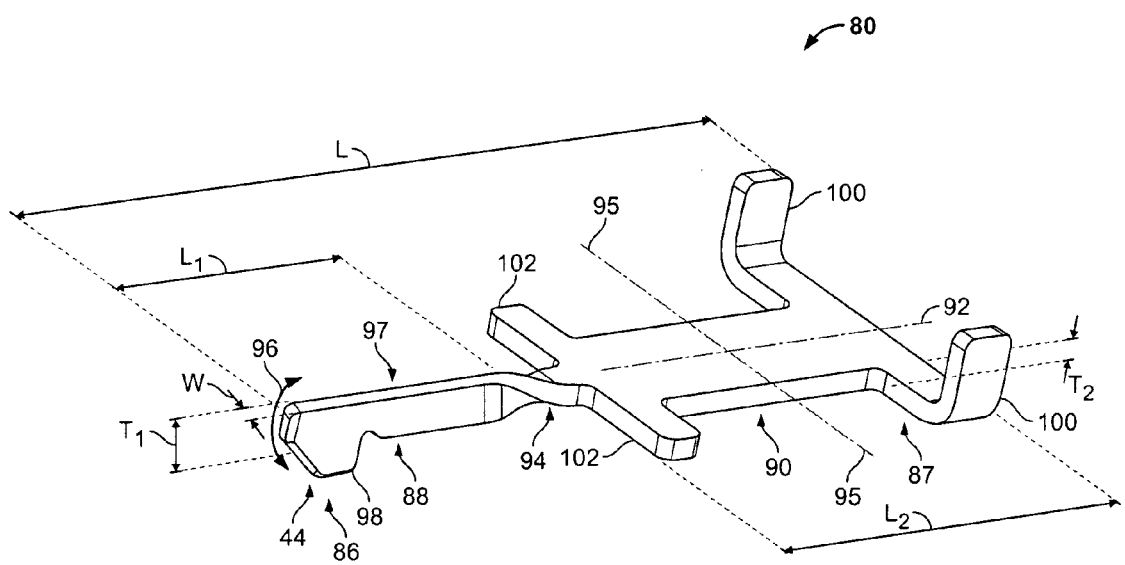
FIG. 5 is a perspective view of an exemplary embodiment of a latch body of the pluggable electrical component shown in FIGS. 3 and 4.

FIG. 5 is a perspective view of an exemplary embodiment of the latch body 80. The latch body 80 extends a length L between a latch end portion 86 and a spring end portion 87 that is opposite the latch end portion 86. The latch body 80 includes a latch portion 88 that includes the latch end portion 86, and a spring portion 90 that includes the spring end portion 87. A central longitudinal axis 92 extends along the length L of the latch body 80. The latch and spring portions 88 and 90, respectively, are joined together by a twisted portion 94 such that the latch portion 88 is rotationally displaced about the central longitudinal axis 92 with respect to the spring portion 90, as can be seen in FIG. 5. A cross-sectional thickness $T_1$ of the latch portion 88 is therefore greater than a cross-sectional thickness $T_2$ of the spring portion 90 such that the latch portion 88 is stiffer than at least a portion of the spring portion 90 with respect to bending along the central longitudinal axis 92. Accordingly, the spring portion 90 is configured to bend to move the latch element 44 between the latched and unlatched positions (shown in FIGS. 10 and 11, respectively), as will be described below. Specifically, the spring portion 90 is configured to bend about a bend axis 95 that is approximately perpendicular to the central longitudinal axis 92 of the latch body 80 such that the latch element 44 moves along an arc 96 centered about the bend axis 95 as the spring portion 90 bends about the bend axis 95.

As can be seen in FIG. 5, the cross-sectional thickness of the latch portion 88 varies along a length $L_1$ of the latch portion 88, with a portion 97 of the latch portion 88 having the cross-sectional thickness $T_1$. However, the other portions of the latch portion 88 other than portion 97 also have a cross-sectional thickness that is greater than the cross-sectional thickness $T_2$ of the spring portion 90 such that the spring portion 90 bends rather than the latch portion 88 when the latch assembly 18 is actuated as described below. Although in the illustrated embodiment the cross-sectional thickness $T_2$ of the spring portion 90 is approximately uniform along a length $L_2$ of the entirety of the spring portion 90 such that the cross-sectional thickness of the spring portion 90 along the entirety of the length $L_2$ of the spring portion 90 is smaller than the cross-sectional thickness $T_1$ of the portion 97 of the latch portion 88, alternatively only a portion of the length $L_2$ of the spring portion 90 has a cross-sectional thickness that is smaller than the cross-sectional thickness(es) of the latch portion 88, as long as the spring portion 90 bends instead of the latch portion 88. Although a width W of the latch portion 88 is shown to be approximately equal to the cross-sectional thickness $T_2$ of the spring portion 90, alternatively the width W of the latch portion 88 is different than the cross-sectional thickness $T_2$ of the spring portion, so long as the cross-sectional thickness of the latch portion 88 is greater than the cross-sectional thickness of at least a portion of the spring portion 90.

Although shown in FIG. 5 as being located at approximately a center of the length $L_2$ of the spring portion 90, the bend axis 95 may be located anywhere along the length $L_2$ of the spring portion 90 that enables the latch element 44 to move between the latched and unlatched positions. Generally, the location of the bend axis 95 will coincide with the location of the smallest (if not uniform) cross-sectional thickness of the spring portion 90.

As described above, the latch portion 88 includes the latch element 44 that cooperates with the latch element 42 (FIG. 1) of the receptacle assembly guide frame 20 (FIG. 1). Cooperation between the latch elements 42 and 44 to latch the electrical component 12 to the guide frame 20 will be described below. The latch elements 42 and 44 may each have any suitable shape and may each include any suitable structure that enables the latch elements 42 and 44 to latch the electrical component 12 to the guide frame 20. In the illustrated embodiment, the latch element 44 includes a hook portion 98 that engages the opening 48 of the latch element 42.

The spring portion 90 of the latch body 80 includes a pair of opposite retention posts 100 and a pair of opposite ramp tabs 102. As will be described below, the retention posts 100 facilitate retaining the latch body 80 in position on the electrical component housing 64, and the ramp tabs 102 cooperate with corresponding ramps 110 on the actuator slide 84 to move the latch element 44 between the latched and unlatched positions. In some embodiments, the latch portion 88, the spring portion 90, and/or the twisted portion 94 are integrally formed. For example, the latch body 80 may be stamped out of a single sheet of material.

FIGS. 6 and 7 are perspective views of an exemplary embodiment of the actuator slide 84. The actuator slide 84 includes a body 104 having a pair of opposite side portions 106 and 108. The side portion 106 includes a pair of ramps 110 that, as will be described below, cooperate with the ramp tabs 102 (FIG. 5) of the latch body 80 (FIG. 5) to move the latch element 44 between the latched and unlatched positions. The actuator slide body 104 also includes a pair of opposite slots 112 for holding end portions 113 of corresponding legs 114 (FIGS. 10 and 11) of the actuator arm 82, as will be described below. A pair of slide bearings 116 extend on opposite side portions 118 and 120 of the actuator slide body 104 for guiding movement of the actuator slide 84 along the electrical component housing 64 as described below. An opening 122 within the body 104 extends within the side portion 106 adjacent a rear end portion 123 of the body 104 for receiving a portion of the twisted portion 94 (FIG. 5) of the latch body 80 therein.

Figure 8:
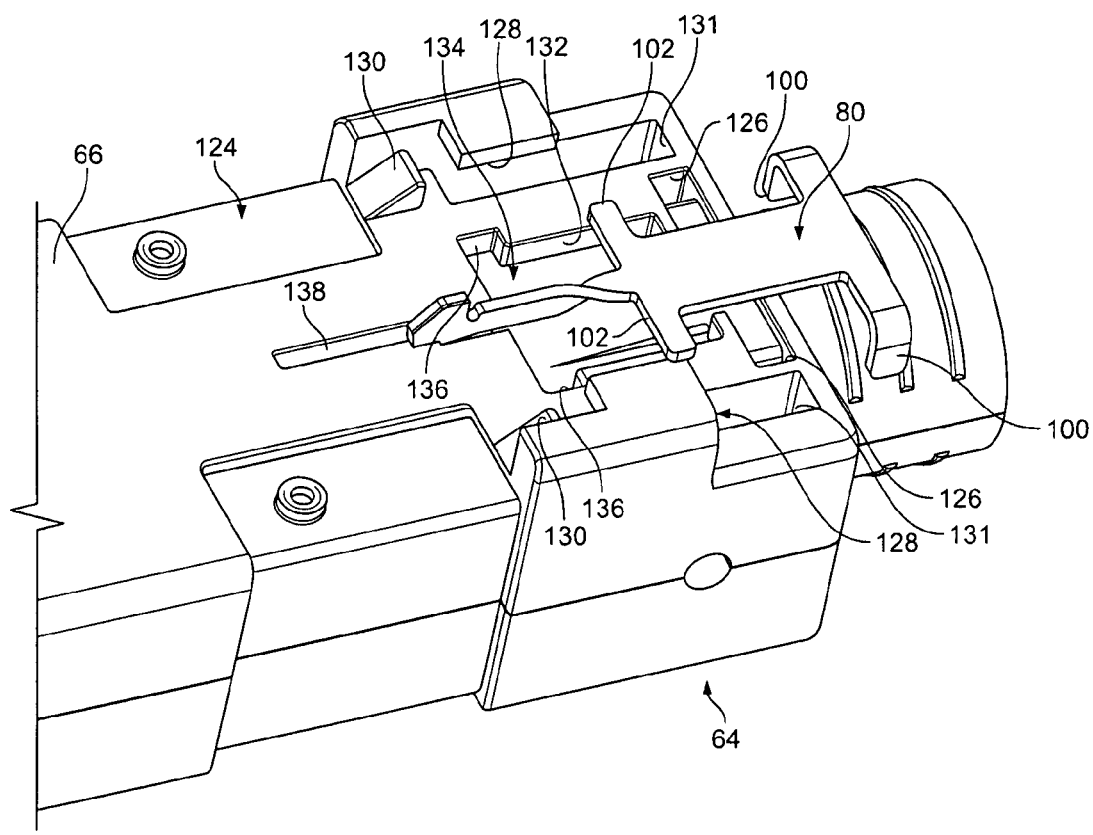
FIG. 8 is a partially exploded perspective view of an exemplary embodiment of a portion of a housing of the electrical component shown in FIGS. 3 and 4 and the latch body shown in FIG. 5.

FIG. 8 is a partially exploded perspective view of an exemplary embodiment of a portion of the electrical component housing 64 illustrating how the latch body 80 is held thereby. The housing base 66 includes a bottom side portion 124 that includes pair of opposite retention openings 126, a pair of opposite guide slots 128, a pair of opposite slide stops 130, a pair of opposite leg openings 131, and a latch body opening 132. Each of the retention openings 126 receives a corresponding one of the retention posts 100 therein to facilitate retaining the latch body 80 in position on the bottom side portion 124 of the housing base 66. Each of the guide slots 128 receives a corresponding one of the slide bearings 116 (FIGS. 6 and 7) of the actuator slide 84 (FIGS. 6 and 7) therein for guiding movement of the actuator slide 84 along the bottom side portion 124 of the housing base 66, as will be described below. The latch body opening 132 receives the latch body 80 therein and includes a main opening 134 that receives the spring portion 90 of the latch body 80 therein. A pair of opposite slots 136 extend from the main opening 134 and each receive a corresponding one of the latch body ramp tabs 102 therein. Another slot 138 extends from the main opening 134 for receiving the latch portion 88 of the latch body 80. The slide stops 130 are each positioned on the bottom side portion 124 of the housing base 66 for limiting movement of the actuator slide 84 along the bottom side portion 124, as described below. Each of the leg openings 131 receives a corresponding one of the actuating arm legs 114 (FIGS. 10 and 11) therethrough such that end portions 113 of the actuating arm legs 114 extend on the bottom side portion 124 of the housing base 66.

Figure 9:
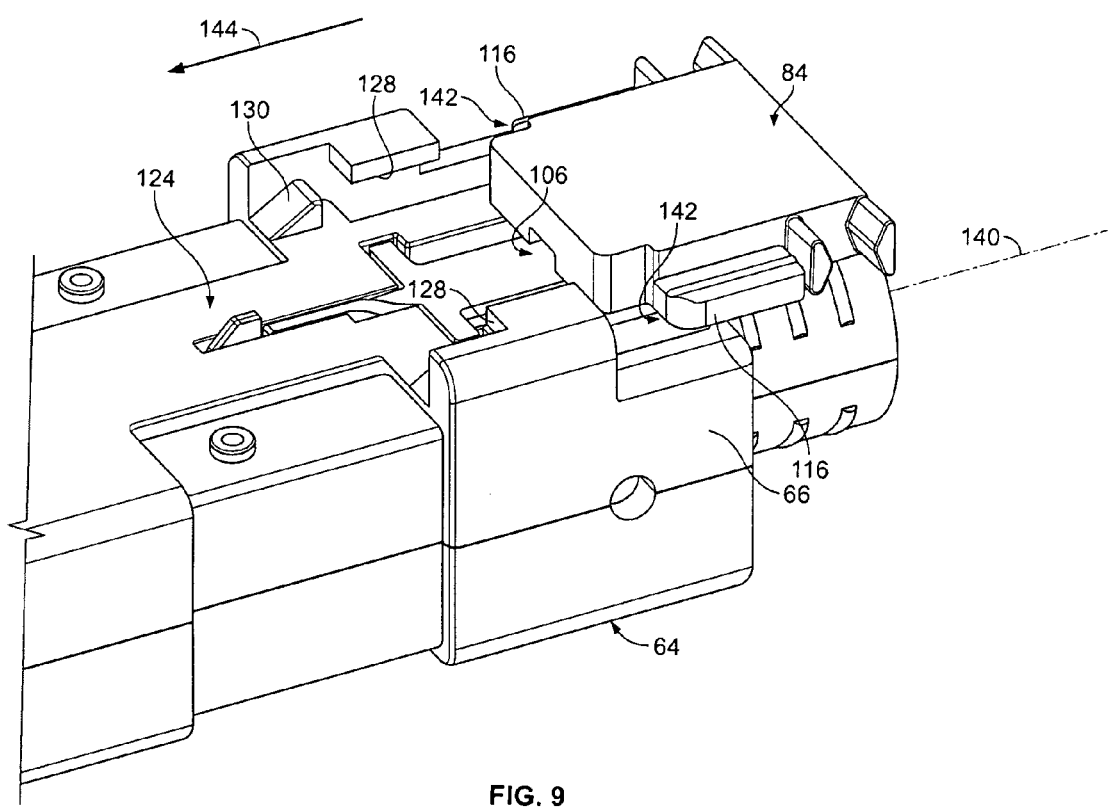
FIG. 9 is a partially exploded perspective view of an exemplary embodiment of a portion of a housing of the electrical component shown in FIGS. 3 and 4 and the actuator slide shown in FIGS. 6 and 7.

FIG. 9 is a partially exploded perspective view of an exemplary embodiment of a portion of the electrical component housing 64 illustrating how the actuator slide 84 is held thereby. The actuator slide 84 is positioned over the bottom side portion 124 of the housing base 66 such that the side portion 106 of the actuator slide 84 faces the bottom side portion 124. Each of the slide bearings 116 is received within a corresponding one of the guide slots 128 of the housing base 66 such that the actuator slide 84 is movable along the bottom side portion 124 of the housing base 66 along a central longitudinal axis 140 of the housing 64. The slide stops 130 of the housing base 66 are positioned to engage rear portions 142 of the slide bearings 116 to limit movement of the actuator slide 84 along the central longitudinal axis 140 of the housing 64 in a direction indicated by the arrow 144.

FIG. 10 is a perspective view of an exemplary embodiment of the latch assembly 18 shown in the latched position. FIG. 11 is broken away perspective view of a portion of the electrical component 12 illustrating the latch assembly 18 in the unlatched position. The housing base 66 (FIGS. 3, 4, 8, and 9) is omitted from FIG. 11 for clarity. As can be seen in FIGS. 10 and 11, the actuating arm 82 includes the actuating legs 114, which each extend between a pair of opposite end portions 113 and 115. The end portions 115 of the legs 114 are attached to a cross member 146 that extends between the end portions 115 and on a top side portion 148 of the housing cover 68. At least one opening 150 extends through the housing cover 68 at the top side portion 148. The legs 114 of the actuating arm 82 extend through the opening 150 and through an interior of the housing 64. The end portions 113 of the legs 114 extend through the leg openings 131 (FIG. 8) in the housing base 66 such that the end portions 113 extend along the bottom side portion 124 (FIGS. 8 and 9) of the housing base 66. Each leg end portion 113 is received within the corresponding slot 112 of the actuator slide 84 to connect the actuator arm 82 to the actuator slide 84. The leg end portions 113 may each be secured within the corresponding slot 112 using any suitable structure and/or means, such as, but not limited to, using an interference fit. Each leg 114 of the actuator arm 82 includes an extension 152 that is received within corresponding opening 154 within the housing 64 to facilitate holding the actuating arm 82 as well as providing a pivot point 156 for movement of the actuating arm 82. Although shown as extending completely through the housing 64 such that the extensions 152 are visible on an exterior of the housing 64, each opening 154 may alternatively extend only partially through an interior surface (not shown) of the housing 64 such that the opening 154 and corresponding extension 152 are not visible on an exterior of the housing 64.

As described above, FIG. 10 illustrates the latch assembly 18 in the latched position wherein the latch element 44 is positioned to engage the latch element 42 (FIG. 1) of the guide frame 20 (FIG. 1). To unlatch the latch assembly 18, the cross member 146 is pulled in the direction of the arrow 158 such that the actuating arm 82 is rotated about the pivot point 156. Thereby, the actuator slide 84 is moved along the bottom side portion 124 of the housing base 66 in the direction of the arrow 160. As the actuator slide 84 moves in the direction 160, the ramps 110 engage the ramp tabs 102 of the latch body 80 and force the ramp tabs 102 in the direction of the arrow 162 such that the ramp tabs 102 move deeper (further into the bottom side portion 124) within the slots 136 (FIG. 8) of the housing base 66. Movement of the ramp tabs 102 in the direction of the arrow 162 causes the spring portion 90 of the latch body 80 to bend along the bend axis 95 and thereby moves the latch element 44 along the arc 96 into the unlatched position, wherein the latch element 44 is positioned deeper (further into the bottom side portion 124) within the slot 138 (FIG. 8) such that the latch element 44 is disengaged from the latch element 42. The unlatched position is shown in FIG. 11. When the cross member 146 is released, the natural bias of the spring portion 90 causes the spring portion 90 to return (unbend about the bend axis 95) to the original state of the spring portion 90 which forces the actuator slide 84 to move back in the direction of the arrow 158 and moves the latch element 44 along the arc 96 back to the latched position shown in FIG. 10.

The cross member 146 may optionally include a pull tab 164 (FIG. 3) connected thereto to facilitate actuating the latch assembly 18. Moreover, the cross member 146 may optionally include a structure and/or means that facilitates gripping the cross member 146 with a finger or thumb, such as, but not limited to, an extension 166 and/or a textured surface.

As described above, in the exemplary embodiment of FIGS. 1-11, the latch and spring portions 88 and 90, respectively, are joined together by the twisted portion 94 such that a cross-sectional thickness $T_1$ of the latch portion 88 is greater than a cross-sectional thickness $T_2$ of the spring portion 90. The latch portion 88 is thereby stiffer than at least a portion of the spring portion 90 with respect to bending along the central longitudinal axis 92. Alternatively, the latch portion 88 may be provided as stiffer than at least a portion of the spring portion 90 with respect to bending along the central longitudinal axis 92 using any other suitable structure, means, and/or the like that enables the latch assembly 18 to function as describe herein, such as, but not limited to, fabricating the latch and spring portions 88 and 90, respectively, using different materials that have different material properties (such as, but not limited to, stiffness), embossing the a material forming the latch body 80 to provide the latch and spring portions 88 and 90, respectively, with different cross-sectional thicknesses, fabricating the latch body 80 from a sheet of material having portions with different cross-sectional thicknesses, separately fabricating the latch and spring portions 88 and 90, respectively, with different cross-sectional thicknesses and thereafter connecting the latch portion 88 and the spring portion 90 together.

Figure 12:
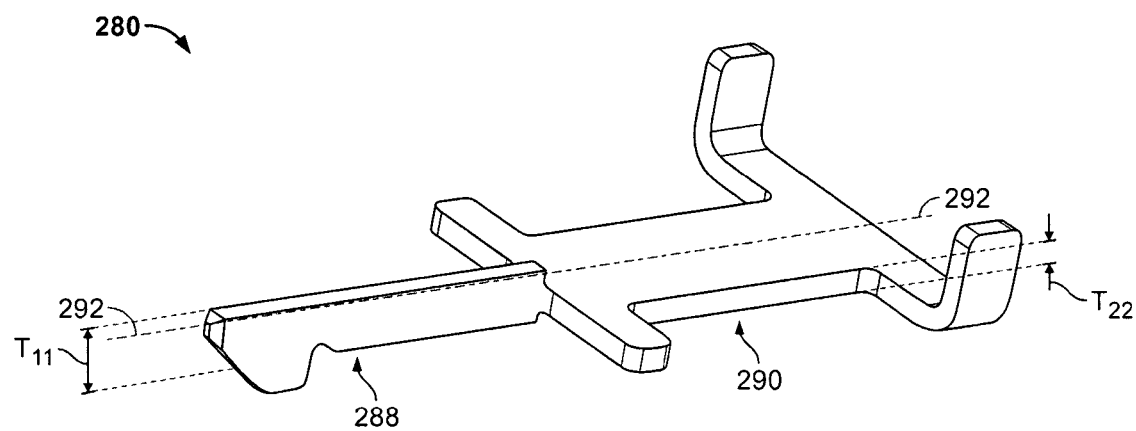
FIG. 12 is a perspective view of an exemplary alternative embodiment of a latch body.

FIG. 12 is a perspective view of an exemplary alternative embodiment of a latch body 280. The latch body 280 includes a latch portion 288 and a spring portion 290. A cross-sectional thickness $T_{11}$ of the latch portion 288 is greater than a cross-sectional thickness $T_{22}$ of the spring portion 290 such that the latch portion 288 is stiffer than at least a portion of the spring portion 290 with respect to bending along a central longitudinal axis 292. To provide the different cross-sectional thickness $T_{11}$ and $T_{22}$ shown in FIG. 12, the latch body 280 may be embossed from a material, the latch body 280 may be fabricated from a sheet of material having portions with different cross-sectional thicknesses, the latch and spring portions 288 and 290, respectively, may be separately fabricated with different cross-sectional thicknesses and thereafter connected together using any suitable structure, means, and/or the like, such as, but not limited to, welding, brazing, soldering, using an adhesive, and/or the like.

The embodiments described and illustrated herein provide an electrical component latch that may have a less complicated actuating mechanism than at least some known electrical component latches and/or that may take up less space within a housing of the electrical component than at least some known electrical component latches.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." When introducing elements/components/etc. described and/or illustrated herein, the articles "a", "an", "the", "said", and "at least one" are intended to mean that there are one or more of the element(s)/component(s)/etc. Moreover, in the following claims, the terms "first," "second," and "third," etc. are used merely as labels, and are not intended to impose numerical requirements on their objects. Further, the limitations of the following claims are not written in means—plus-function format and are not intended to be interpreted based on 35 U.S.C. § 112, sixth paragraph, unless and until such claim limitations expressly use the phrase "means for" followed by a statement of function void of further structure.

While the invention has been described in terms of various specific embodiments, those skilled in the art will recognize that the invention can be practiced with modification within the spirit and scope of the claims.

What is claimed is:

1. A latch comprising:
   a body comprising a latch portion, a spring portion, and a central longitudinal axis extending along a length of the body;
   the latch portion including a latch element; and
   wherein the latch and spring portions are joined together by a twisted portion such that the latch portion is rotationally displaced about the central longitudinal axis with respect to the spring portion.

2. The latch according to claim 1, wherein at least one of at least a portion of the spring portion has a smaller cross-sectional thickness than the latch portion, and the latch portion is stiffer than at least a portion of the spring portion with respect to bending along the central longitudinal axis.

3. The latch according to claim 1, wherein the spring portion is configured to bend to move the latch element.

4. The latch according to claim 1, wherein the spring portion is configured to bend about a bend axis that is approximately perpendicular to the central longitudinal axis of the body, the latch element moving along an arc centered about the bend axis as the spring portion bends about the bend axis.

5. The latch according to claim 1, wherein the latch portion and the spring portion are integrally formed.

6. The latch according to claim 1, wherein the body extends the length between a latch end portion and a spring end portion that is opposite the latch end portion, the latch portion including the latch end portion, the spring portion including the spring end portion.

7. An electrical component assembly configured to engage a receptacle assembly, the electrical component assembly comprising:
   a housing configured to be at least partially received into the receptacle assembly;
   a latch held by the housing, the latch comprising a body comprising a latch portion, a spring portion, and a central longitudinal axis extending along a length of the body, the latch portion including a latch element; and
   an actuator slide held by the housing, the actuator slide comprising a ramp configured to engage the latch body to bend the spring portion and thereby move the latch element.

8. The electrical component assembly according to claim 7, wherein at least one of at least a portion of the spring portion has a smaller cross-sectional thickness than the latch portion, and the latch portion is stiffer than at least a portion of the spring portion with respect to bending along the central longitudinal axis.

9. The electrical component assembly according to claim 7, wherein the latch body extends the length between a latch end portion and a spring end portion that is opposite the latch end portion, the latch portion including the latch end portion, the spring portion including the spring end portion.

10. The electrical component assembly according to claim 7, wherein the spring portion is configured to bend about a bend axis that is approximately perpendicular to the central longitudinal axis of the body, the latch element moving along an arc centered about the bend axis as the spring portion bends about the bend axis.

11. The electrical component assembly according to claim 7, wherein the latch portion and the spring portion are integrally formed.

12. The electrical component assembly according to claim 7, wherein the latch and spring portions are joined together by a twisted portion such that the latch portion is rotationally displaced about the longitudinal axis with respect to the spring portion.

13. The electrical component assembly according to claim 7, wherein the latch element is configured to be at least partially received within an opening of the receptacle assembly.

14. An electrical component assembly configured to engage a receptacle assembly, the electrical component assembly comprising:
   a housing configured to be at least partially received into the receptacle assembly; and a latch held by the housing, the latch comprising a body including a latch portion joined to a spring portion and a central longitudinal axis extending along a length of the body, the latch portion including a latch element, the spring portion being configured to bend to move the latch element between a latched position and an unlatched position, wherein the latch portion and the spring portion are joined together by a twisted portion such that the latch portion is rotationally displaced about the central longitudinal axis with respect to the spring portion.

15. The electrical component assembly according to claim 14, wherein the latch portion and the spring portion are integrally formed.

16. The electrical component assembly according to claim 14, wherein the spring portion is configured to bend about a bend axis that is approximately perpendicular to the central longitudinal axis of the body, the latch element moving along an arc centered about the bend axis as the spring portion bends about the bend axis.

17. The electrical component assembly according to claim 14, wherein the latch body extends the length between a latch end portion and a spring end portion that is opposite the latch end portion, the latch portion includes the latch end portion, and the spring portion includes the spring end portion.

18. The electrical component assembly according to claim 14, wherein at least one of at least a portion of the spring portion has a smaller cross-sectional thickness than the latch portion and the latch portion is stiffer than at least a portion of the spring portion with respect to bending along the central longitudinal axis of the body.

19. The electrical component assembly according to claim 14, wherein the latch element is configured to be at least partially received within an opening of the receptacle assembly.

* * * * *